(No Model.)
A. McDONALD.
STONE CUTTING MACHINE.
No. 503,156. Patented Aug. 15, 1893.
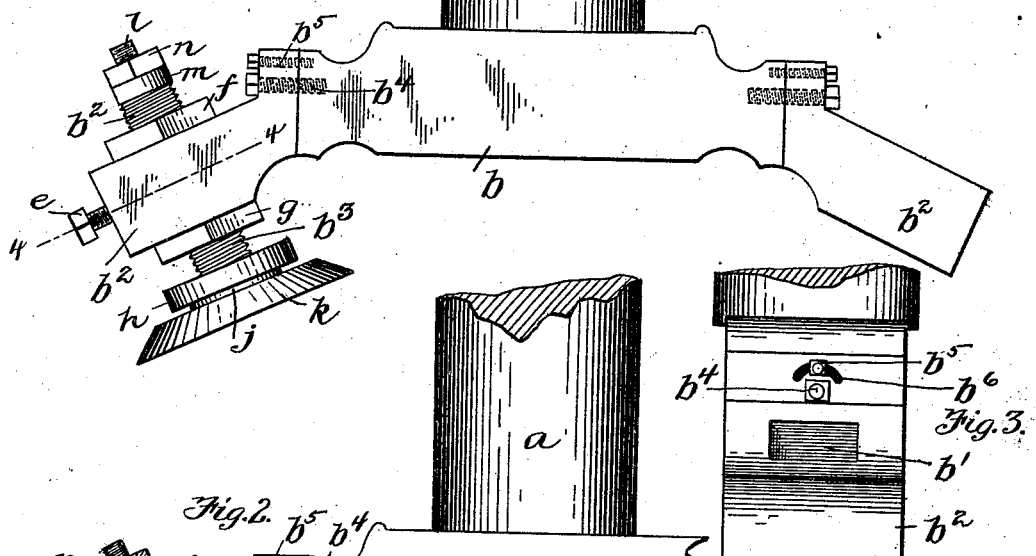

UNITED STATES PATENT OFFICE.

ALEXANDER McDONALD, OF CAMBRIDGE, MASSACHUSETTS.

STONE-CUTTING MACHINE.

SPECIFICATION forming part of Letters Patent No. 503,156, dated August 15, 1893.

Application filed April 8, 1892. Serial No. 428,313. (No model.)

*To all whom it may concern:*

Be it known that I, ALEXANDER MCDONALD, of Cambridge, in the county of Middlesex and State of Massachusetts, have invented certain new and useful Improvements in Stone-Cutting Machines, of which the following is a specification.

My invention relates to stone-cutting machinery, and more particularly to the mounting of the cutting devices in such machines, and is designed to be an improvement upon an invention for which I have been granted Patent No. 473,850, dated April 26, 1892.

The invention has for its object to mount the cutting devices in the chuck carrying the same, in such manner that great simplicity of adjustment is attained, and fewer parts involved.

The invention possesses other advantageous features, as shall presently appear.

The cutting device comprises a cutter-head, having a portion of its exterior surface square, or substantially so, to slide in an angular hole in the chuck-arms and is provided in its upper and lower portions with screw-threads adapted to accommodate check-nuts to bear upon the upper and lower surfaces of the chuck arms and afford a means of securing the cutter-head in said chuck arms at the desired elevation. In the lower extremity of the cutter-head, is a recess whose side walls constitute a sleeve to receive a washer, said washer being somewhat thicker than the depth of said recess for a purpose presently to be ascertained. The cutter-head is cored out for its entire length, and forms a bearing for the cutter-spindle, on the lower end of which is carried the cutter. The cutter spindle is provided with a number of radial projections which engage a like number of recesses in the cutting disk, so that, when the spindle is in place, it will be caused to revolve with the cutter. Said spindle extends through the cutter-head, and has near its upper end a squared portion, upon which a washer rests, said washer revolving with the spindle, and bearing upon the upper surface of the cutter-head. A check-nut, screw-threaded, on the end of the spindle, retains this washer in place, as shall presently appear.

The outer extremity of the chuck or chuck arm supporting the cutter-head, is provided with an adjusting-screw, extending into the angular hole, and having on the outside a squared head, and on the inner end a beveled head which engages an undercut groove in the cutter-head. It will now be observed that, as the angular hole is of sufficient width to permit a certain play of the cutter-head, a back and forward adjustment is secured by this adjusting screw, thus permitting all the cutting devices, to be adjusted to describe the same circle. An adjustment of the two check nuts bearing upon the upper and lower surface of the chuck, will allow of the raising and lowering of the cutter-head, the mortised groove permitting the desired movement, while the adjusting screw retains the cutter head in the desired circumferential adjustment.

It will be obvious that I have devised a cutting apparatus, which will be adjustable toward and away from the stone to be cut, and further that an adequate radial adjustment is secured; that the bearings of the cutter are kept free from dust,—all with the least number of parts.

I shall now proceed to describe my said invention more in detail, in connection with the accompanying drawings, in which I have shown the best embodiment of my invention.

Figure 1 is a side view of the apparatus; Fig. 2 a sectional view through one of the cutting devices; Fig. 3 a plan view of one of the arms and mode of securing it to the chuck; Fig. 4 a sectional view on line 4 4 Fig. 1; Fig. 5 a detail of the cutter spindle, and Fig. 6 a bottom view of the cutter.

Chuck $b$ is suitably secured to shaft $a$, to which rotation is imparted in any suitable manner. Arms $b^2$ are secured pivotally to the chuck $b$ by bolt $b^4$. Adjusting bolt $b^5$, in a slot $b^6$ in said arm, permits a certain oscillation of the same and provides means for clamping the arm at the desired angle. Angular perforations or holes $b'$ are provided in the chuck arms, which holes are adapted to receive cutter-head $c$, which is practically square to slide in holes $b'$. Undercut groove $d$ in the head, receives beveled head $e'$ of screw $e$.

The upper and lower portions of the cutter-head are threaded, as at $b^2$ $b^3$, and receive check nuts $f$ $g$, adapted to clamp the cutter-head at the desired adjustment toward and away from the stone. On the lower portion of said cutter-head, disk $h$ is rigidly secured, and is recessed at $i$ to form a bearing or seat for washer $j$. This washer projects below the under surface of the disk, and serves as a bearing for the cutter $k$, with which the spindle $l$ revolves. This spindle has its bearing in the cutter-head, and is provided on its lower end with a suitable number of radial projections, as $l'$, $l^2$, $l^3$, which are adapted to rest in corresponding recesses $k'$, $k^2$, $k^3$, $k^4$, and registers therewith when the spindle is in place. It will be observed that by this arrangement the cutter is secured to the spindle with a large area of the spindle engaging the cutter, resulting in a connection of great rigidity and at the same time there is no protruding part upon the lower surface of the cutter. The upper end of the spindle $l$ has squared portion $l^5$, which carries a washer $m$, said washer serving as a bearing for the top of the spindle. A nut $n$ is screw-threaded on the spindle $l$, as shown. The washer $m$ prevents contact of the nut $n$ with the cutter-head, and cannot therefore be rotated to bind on the cutter-head in its revolution.

The operation of the contrivance will be apparent. Adjustment of the nuts $f$ and $g$ will raise and lower the cutter head, and adjustment of the screw $e$ will provide an adjustment of the head toward and away from the shaft $a$. The washer, seated in the disk $h$, while providing an adequate bearing surface, will exclude dust from the bearings. The means of connecting the spindle and the cutter will permit ready removal of the cutter, and will afford other advantages which will be clear to those skilled in the art to which the invention appertains.

I claim—

1. In a machine for cutting stone, a cutter head mounted in a hole in an arm of a revoluble chuck and carrying a cutter, said cutter head having screw threads on its upper and lower portions, nuts on said threads adapted to bear upon the upper and lower surfaces of said chuck, and a longitudinal undercut groove in said cutter head and engaged by a beveled head on an adjusting screw in the said arm, whereby said cutter is adjusted radially and toward and away from the stone, substantially as described.

2. In combination, a cutter head; a spindle journaled therein, projecting above and below the cutter head, a plurality of radial projections on the lower end of the spindle; a cutting disk carried by the spindle and provided on its under surface with a plurality of radial recesses, which are engaged by the radial projections; a squared portion on the upper end of the spindle; a washer upon the squared portion resting upon the cutter-head, and a nut threaded upon the spindle above the washer so as to retain the radial projections within the radial recesses, as set forth.

3. In combination, a chuck; an arm provided with a slot and secured pivotally on the chuck; a clamping bolt secured to the chuck and projecting through the slot; a cutter-head supported by the arm; check-nuts upon the cutter-head engaging the opposite sides of the arm; a spindle having a bearing in the cutter-head and projecting above and below the same, a squared portion upon the upper end of the spindle; a washer upon the squared portion; a check nut upon the spindle above the washer, and a cutter carried by the lower end of the spindle, substantially as described.

In testimony whereof I have signed my name to this specification, in the presence of two subscribing witnesses, this 5th day of April, A. D. 1892.

ALEXANDER McDONALD.

Witnesses:
JONATHAN CILLEY,
WM. S. ROGERS.